(12) United States Patent
Yamaguchi et al.

(10) Patent No.: US 12,055,212 B2
(45) Date of Patent: Aug. 6, 2024

(54) ELECTROMAGNETIC VALVE CONTROL DEVICE AND WORK VEHICLE

(71) Applicant: KUBOTA CORPORATION, Osaka (JP)

(72) Inventors: Tetsuo Yamaguchi, Sakai (JP); Ryoma Iwase, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/379,335

(22) Filed: Oct. 12, 2023

(65) Prior Publication Data
US 2024/0167562 A1    May 23, 2024

(30) Foreign Application Priority Data

Nov. 17, 2022   (JP) ................................. 2022-184326

(51) Int. Cl.
| | |
|---|---|
| *F16H 61/40* | (2010.01) |
| *F16H 47/04* | (2006.01) |
| *F16H 59/70* | (2006.01) |
| *F16H 61/02* | (2006.01) |
| *F16H 59/36* | (2006.01) |
| *F16H 59/40* | (2006.01) |

(52) U.S. Cl.
CPC ......... *F16H 61/0206* (2013.01); *F16H 47/04* (2013.01); *F16H 59/70* (2013.01); *F16H 61/40* (2013.01); *F16H 2059/366* (2013.01); *F16H 59/40* (2013.01)

(58) Field of Classification Search
CPC ...... F16H 61/0206; F16H 47/04; F16H 59/70; F16H 59/40; F16H 2059/366; F16H 61/40

USPC ........................................ 475/76, 83; 701/61
See application file for complete search history.

(56) References Cited

U.S. PATENT DOCUMENTS

| | | | | |
|---|---|---|---|---|
| 5,671,137 | A * | 9/1997 | Ishino | F16H 61/46 |
| | | | | 701/61 |
| 6,424,902 | B1 * | 7/2002 | Kuras | F16H 61/46 |
| | | | | 701/61 |
| 8,165,765 | B2 * | 4/2012 | DeMarco | F16H 61/472 |
| | | | | 60/434 |

FOREIGN PATENT DOCUMENTS

| | | |
|---|---|---|
| EP | 3 715 673 A1 | 9/2020 |
| JP | 2019-095058 A | 6/2019 |

\* cited by examiner

*Primary Examiner* — Roger L Pang
(74) *Attorney, Agent, or Firm* — Keating & Bennett, LLP

(57) ABSTRACT

An electromagnetic valve control device includes a current gear ratio obtainer to obtain a current gear ratio as a ratio of an output revolutions number of a driver and an output revolutions number of a transmission, a current electric current value obtainer to obtain a current electric current value as a value of an electric current to be inputted to a first electromagnetic valve or a second electromagnetic valve, and a switching controller to, based on the current electric current value and a gear ratio difference as a difference between a target gear ratio and the current gear ratio, perform electromagnetic valve switching control to switch between use of the first electromagnetic valve to control a pump swash plate and use of the second electromagnetic valve to control the pump swash plate.

8 Claims, 9 Drawing Sheets

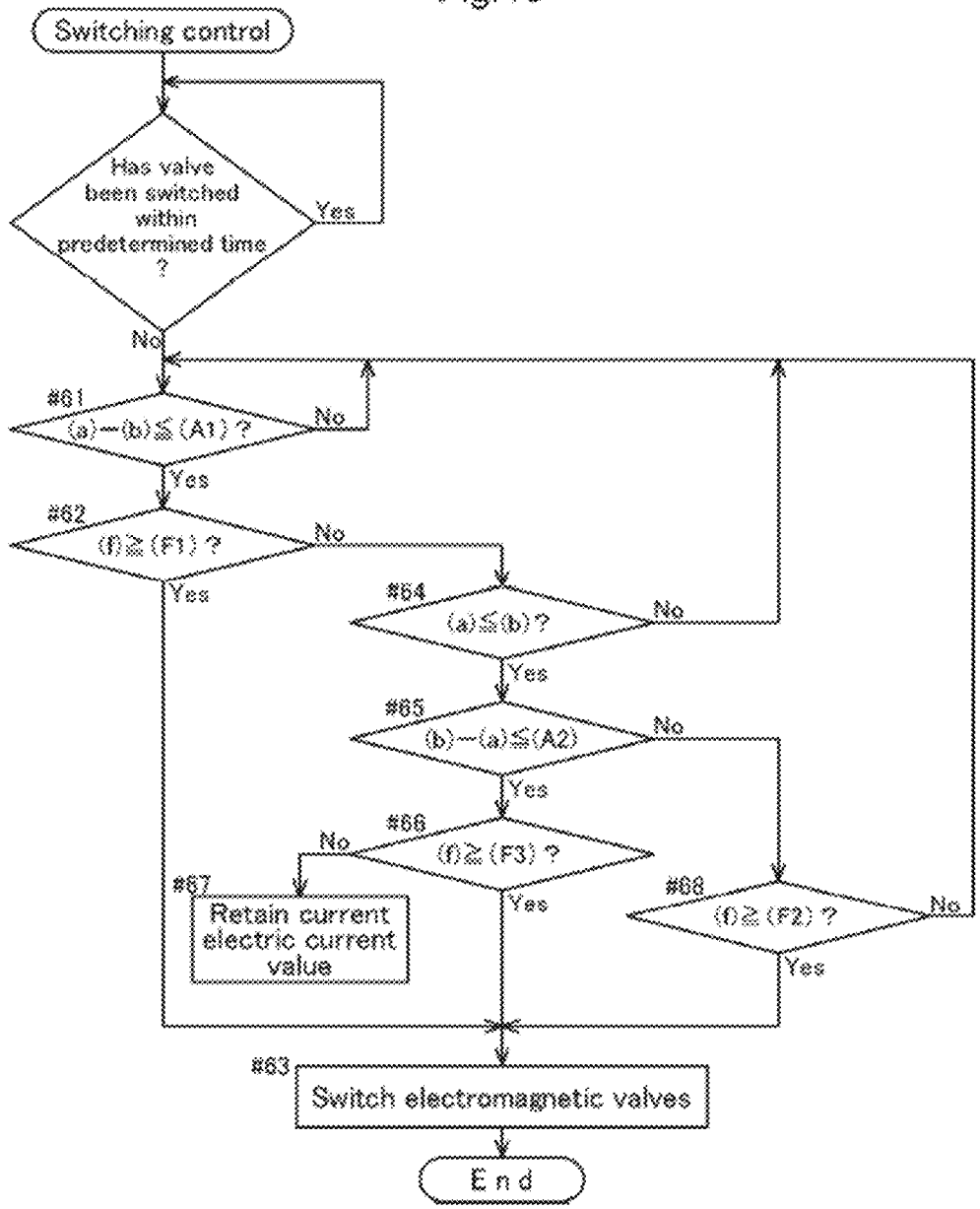

ELECTROMAGNETIC VALVE CONTROL DEVICE AND WORK VEHICLE

CROSS REFERENCE TO RELATED APPLICATIONS

This application claims the benefit of priority to Japanese Patent Application No. 2022-184326 filed on Nov. 17, 2022. The entire contents of this application are hereby incorporated herein by reference.

BACKGROUND OF THE INVENTION

1. Field of the Invention

The present invention relates to an electromagnetic valve control device to control a hydrostatic continuously variable transmission with use of electromagnetic valves and to a work vehicle to control a hydrostatic continuously variable transmission with use of an electromagnetic valve control device.

2. Description of the Related Art

JP 2019-95058 A discloses a work vehicle (tractor) including a hydrostatic continuously variable transmission (continuously variable transmission section), a planetary transmission (compound planetary power transmission section, speed change and output section), a forward/backward travel switching device, a speed change operation tool (shift lever), and a forward/backward travel switching tool (forward-reverse lever). The continuously variable transmission receives and varies motive power from the engine and outputs the varied motive power. The planetary transmission combines motive power from the engine and motive power from the continuously variable transmission and outputs the combined motive power. The planetary transmission also varies the combined motive power in response to the continuously variable transmission being varied. The forward/backward travel switching device is switchable between a forward-travel power transmission state and a backward-travel power transmission state. In the forward-travel power transmission state, the forward/backward travel switching device switches the combined motive power from the planetary transmission into forward-travel motive power and outputs the forward-travel motive power to travel devices (front wheels, rear wheels). In the backward-travel power transmission state, the forward/backward travel switching device switches the combined motive power from the planetary transmission into backward-travel motive power and outputs the backward-travel motive power to the travel devices. The speed change operation tool is for use to vary the continuously variable transmission to change the vehicle speed. The forward/backward travel switching tool is for use to switch the forward/backward travel switching device.

The work vehicle (tractor) configured as above has a vehicle speed determined based on the rotation speed (number of revolutions) of the composite motive power. The rotation speed determined the ratio (gear ratio) between the number of revolutions of the engine and the number of revolutions of the output shaft. The rotation speed of the composite motive power is determined based on the speed range of the planetary transmission and motive power (swash plate angle) outputted from the continuously variable transmission. The speed range is determined through an operation of clutches of the planetary transmission. The continuously variable transmission includes a swash plate that is tilted across a neutral position to and from a state (−MAX) in which the swash plate is maximally tilted to one side and a state (+MAX) in which the swash plate is maximally tilted to the other side. The continuously variable transmission, in other words, alternates between normal rotation and reverse rotation. Each change in the speed range switches the direction in which the swash plate is tilted and thereby switches between normal rotation and reverse rotation. This gradually changes the rotation speed of the composite motive power.

The continuously variable transmission includes a swash plate angle controlled with use of operating oil supplied from a hydraulic cylinder controlled with use of two electromagnetic valves, which are in turn controlled based on the electric current value of a control signal The work vehicle may be configured such that one of the electromagnetic valves controls the swash plate angle on the normal rotation side of the neutral position through the hydraulic cylinder, whereas the other electromagnetic valve controls the swash plate angle on the reverse rotation side of the neutral position through the hydraulic cylinder. The electromagnetic valves are, in this case, switched at the neutral position of the swash plate.

SUMMARY OF THE INVENTION

While the electromagnetic valves receive electric current when the swash plate of the continuously variable transmission starts to tilt at the switch of the electromagnetic valves, the electric current has a value (that is, a rising electric current value) that may vary according to each electromagnetic valve due to, for example, a load on an axle (that is, the input and output shafts of the continuously variable transmission), the temperature of operating oil, or the number of revolutions of the engine. This may lead to the gear ratio being controlled inappropriately near the neutral position of the swash plate.

For instance, the gear ratio may not reach its target value even in response to the electromagnetic valves being switched and the electric current value to control the electromagnetic valves being brought to a predetermined rising electric current value. The gear ratio may reach its target value before the electric current value reaches the rising electric current value. Further, controlling the electromagnetic valves may be followed by the start of the tilt of the swash plate with a problematic delay in-between due to the configuration of the hydraulic circuit.

Preferred embodiments of the present invention switch electromagnetic valves in a timely manner.

An electromagnetic valve control device according to a preferred embodiment of the present invention is an electromagnetic valve control device for a transmission to vary motive power from a driver with use of a gear transmission and a hydrostatic continuously variable transmission and output a varied motive power, the electromagnetic valve control device being configured or programmed to control, based on a target gear ratio and with use of a value of electric current for the continuously variable transmission, a first electromagnetic valve to control a pump swash plate on a normal rotation side of a neutral position and a second electromagnetic valve to control the pump swash plate on a reverse rotation side of the neutral position, a current gear ratio obtainer to obtain a current gear ratio as a ratio of a number of output revolutions of the driver and a number of output revolutions of the transmission, a current electric current value obtainer to obtain a current electric current value as a value of an electric current to be inputted to the first electromagnetic valve or the second electromagnetic valve, and a switching controller configured or programmed to, based on the current electric current value and a gear ratio difference as a difference between the target gear ratio and the current gear ratio, perform electromagnetic valve switching control of switching between use of the first electromagnetic valve to control the pump swash plate and use of the second electromagnetic valve to control the pump swash plate.

A work vehicle according to a preferred embodiment of the present invention includes a driver, a hydrostatic continuously variable transmission to vary motive power from the driver and output the varied motive power, a gear transmission to composite motive power from the driver and motive power from the hydrostatic continuously variable transmission, vary the composite motive power, and output the varied composite motive power, a first electromagnetic valve to control a pump swash plate of the continuously variable transmission on a normal rotation side of a neutral position, a second electromagnetic valve to control the pump swash plate on a reverse rotation side of the neutral position, and an electromagnetic valve control device according to one of the above-described preferred embodiments of the present invention.

Each preferred embodiment above is capable of performing electromagnetic valve switching control in accordance with how the pump swash plate is controlled with use of the first and second electromagnetic valves, as detected based on the gear ratio difference. This allows the electromagnetic valves to be switched in a timely manner.

The switching controller may be configured or programmed to perform the electromagnetic valve switching control in response to (i) the current electric current value being not larger than a predetermined electric current threshold value and simultaneously (ii) the gear ratio difference being not smaller than a predetermined gear ratio difference threshold value.

The above configuration allows the switching controller to switch the electromagnetic valves more accurately and in a timelier manner, based on the current electric current value and the gear ratio difference.

An electromagnetic valve control device according to a preferred embodiment of the present invention may further include a storage to store information on a rising electric current value as a value of the electric current at which value the pump swash plate starts to tilt from the neutral position, wherein the switching controller is configured or programmed to subtract the rising electric current value from the current electric current value to provide a first difference and performs the electromagnetic valve switching control in response to (i) the first difference being not larger than a predetermined first electric current threshold value as the electric current threshold value and simultaneously (ii) the gear ratio difference being not smaller than a predetermined first switching target deviation as the gear ratio difference threshold value.

The above configuration allows the switching controller to, based on a rising electric current value that varies due to, for example, a load on an axle, the temperature of operating oil, and the number of revolutions of the engine, switch the electromagnetic valves early in response to the gear ratio difference being large even if the current electric current value has not reached the rising electric current value. This allows the electromagnetic valves to be switched in a timely manner.

The switching controller may be configured or programmed to perform the electromagnetic valve switching control in response to (i) the current electric current value being not larger than the rising electric current value and simultaneously (ii) the gear ratio difference being not smaller than a predetermined second switching target deviation as the gear ratio difference threshold value, the second switching target deviation being smaller than the first switching target deviation.

The above configuration allows the switching controller to switch the electromagnetic valves in response to the current gear ratio being apart from the target gear ratio by not smaller than a predetermined value even if the current electric current value has not reached the rising electric current value. This allows the electromagnetic valves to be switched appropriately.

The switching controller may be configured or programmed to subtract the current electric current value from the rising electric current value to provide a second difference and performs the electromagnetic valve switching control in response to (i) the second difference being not larger than a predetermined second electric current threshold value and simultaneously (ii) the gear ratio difference being not smaller than a predetermined third switching target deviation as the gear ratio difference threshold value, the third switching target deviation being smaller than the second switching target deviation.

The above configuration allows the switching controller to perform electromagnetic valve switching control before the current electric current value reaches the rising electric current value, and allows the switching controller to switch the electromagnetic valves in a timely manner and bring the gear ratio to an appropriate value early.

The switching controller may be configured or programmed to retain the value of electric current to control the first electromagnetic valve and the second electromagnetic valve in response to (i) the second difference being not larger than the second electric current threshold value and simultaneously (ii) the gear ratio difference being smaller than the third switching target deviation.

The above configuration allows the switching controller to retain the current electric current value and then resume electromagnetic valve switching control in response to the gear ratio difference increasing by not smaller than a predetermined value. This allows the electromagnetic valves to be switched in a timely manner.

The switching controller may be configured or programmed to avoid performing the electromagnetic valve switching control over a predetermined time period after once performing the electromagnetic valve switching control.

The switch of the electromagnetic valves may be followed by input of a control signal (or electric current value) into the electromagnetic valves with a time lag in-between or by the start of the tilt of the swash plate with a time lag in-between. Further, switching the electromagnetic valves repeatedly at short intervals may lead to unstable operation of the continuously variable transmission. The above configuration prevents the electromagnetic valves from being switched at short intervals. This ensures appropriate input of a control signal (or electric current value), appropriate tilt of the swash plate, and stable operation of the continuously variable transmission.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10 is a flowchart illustrating an example flow of electromagnetic valve switching control.

DETAILED DESCRIPTION OF THE PREFERRED EMBODIMENTS

Figure 1:
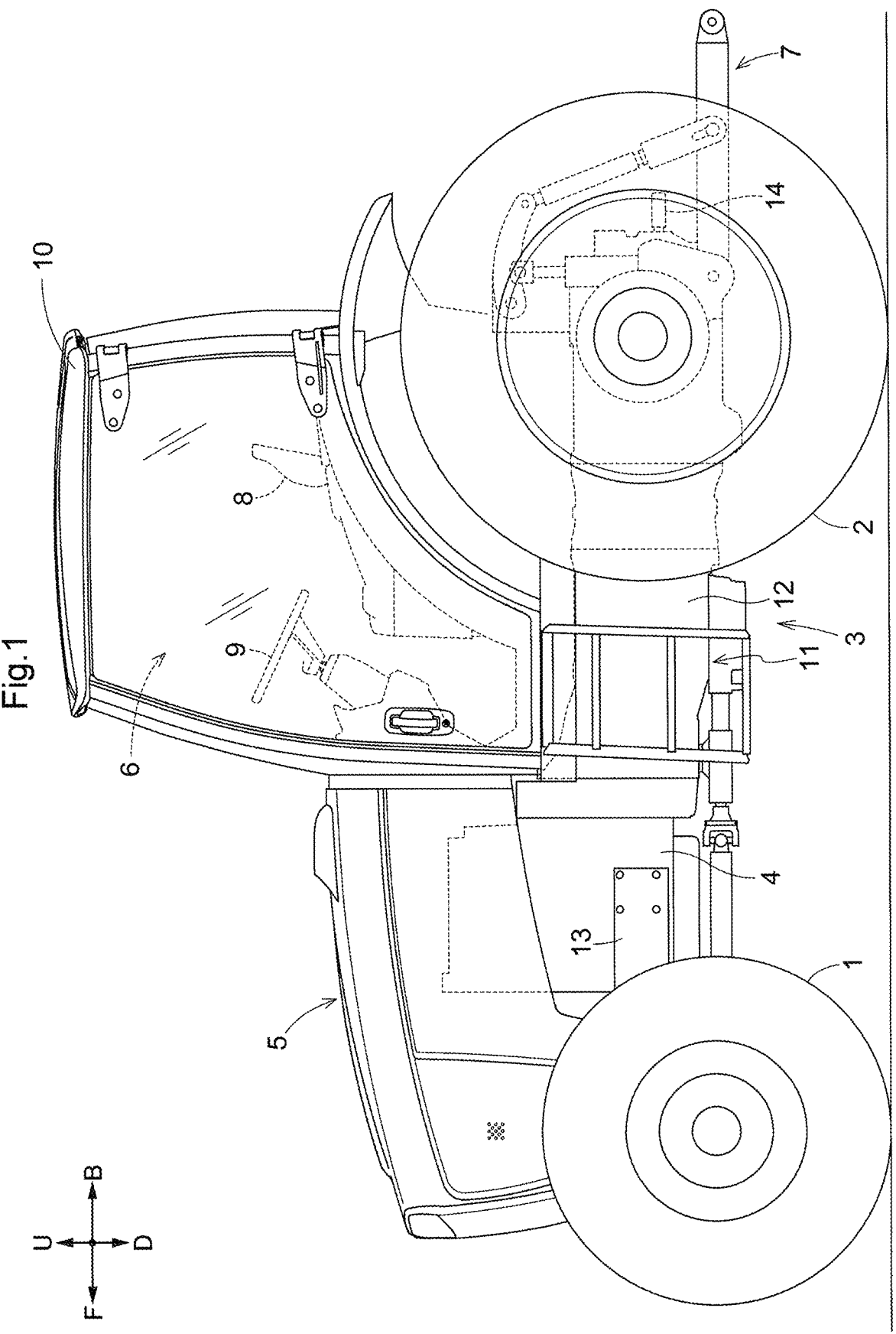
FIG. 1 is a side view of a tractor, illustrating an example configuration.

The description below deals with a tractor as a non-limiting example of work vehicles of preferred embodiments of the present invention with reference to drawings. The preferred embodiments described below relates to a tractor including a body as a non-limiting example. FIG. 1 shows arrow F to indicate the forward side of the body, arrow B to indicate the backward side of the body, arrow U to indicate the upward side of the body, and arrow D to indicate the downward side of the body. The front side of FIG. 1 corresponds to the left side of the body, whereas the back side of FIG. 1 corresponds to the right side of the body.

As illustrated in FIG. 1, the tractor includes a pair of left and right turnable and drivable front wheels 1 ("travel device"), a pair of left and right drivable rear wheels 2 ("travel device"), and a body 3 supported by the front and rear wheels 1 and 2. The tractor includes a motive section 5 including an engine 4 ("driver") at a front portion of the body 3. The tractor includes a driver 6 and a link mechanism 7 at a back portion of the body 3. The driver 6 is configured to accommodate an operator to drive the tractor. The link mechanism 7 is configured to couple an implement such as a rotary tiller device to the tractor in such a manner that the implement is capable of being lifted and lowered. The driver 6 includes a driver's seat 8, a steering wheel 9 for use to turn the front wheels 1, and a cabin 10 defining a driver space. The body 3 includes a body frame 11 including an engine 4, a transmission case 12, and front-wheel support frame members 13. The transmission case 12 includes a front portion coupled to a back portion of the engine 4. The front-wheel support frame members 13 are coupled to a lower portion of the engine 4. The tractor includes a power takeoff shaft 14 at a back portion of the transmission case 12. The power takeoff shaft 14 is configured to take off motive power from the engine 4 and transmits the motive power to the implement coupled with use of the link mechanism 7.

Figure 2:
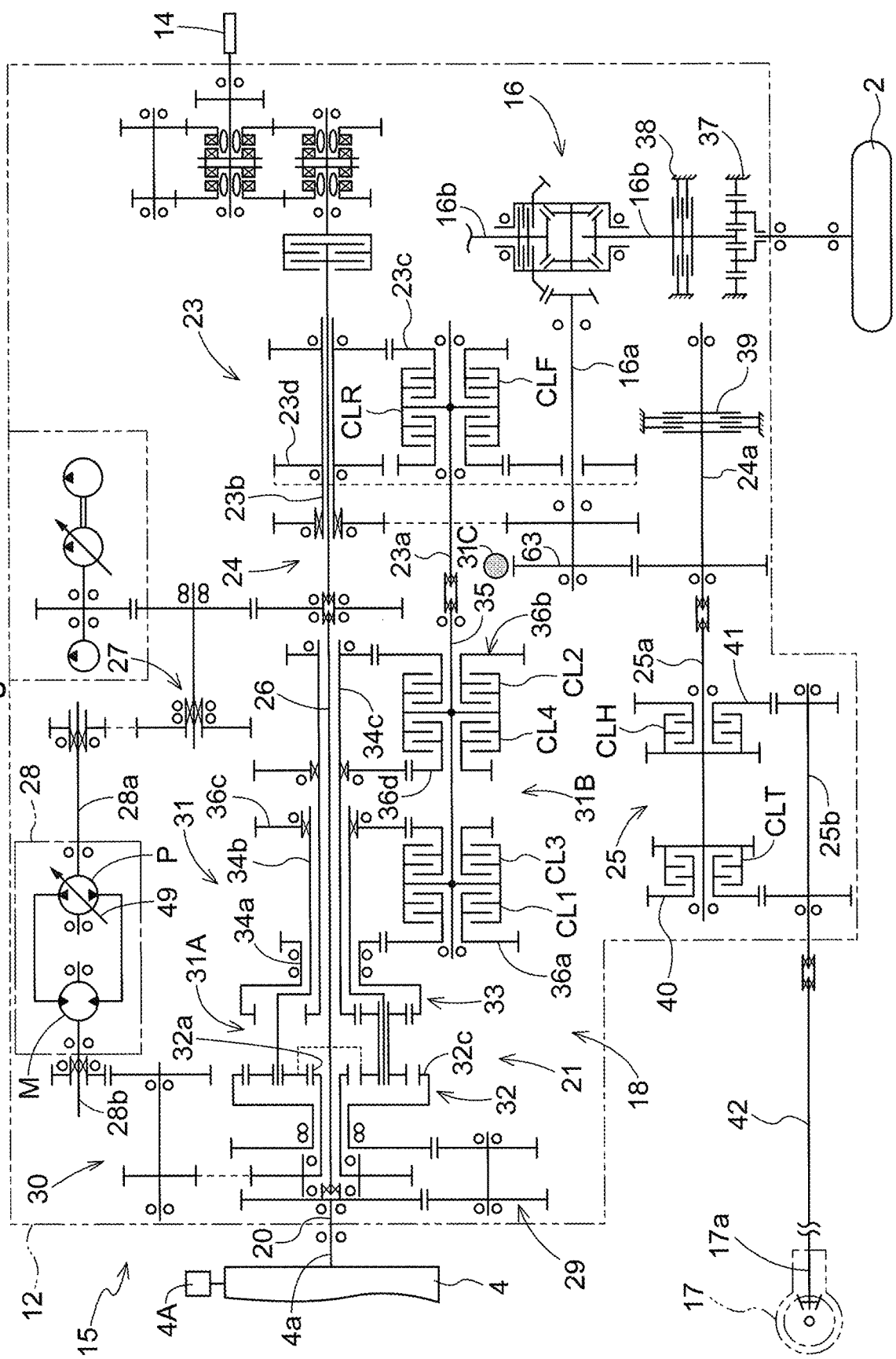
FIG. 2 is a diagram schematically illustrating an example configuration of a power transmission.

As illustrated in FIG. 2, the tractor includes a power transmission 15 for travel, a rear-wheel differential mechanism 16, and a front-wheel differential mechanism 17. The power transmission 15 is configured to transmit motive power from the engine 4 to the front and rear wheels 1 and 2. The power transmission 15 includes a transmission 18 contained in the transmission case 12 and configured to vary motive power from the engine 4 and transmit the varied motive power to the rear-wheel differential mechanism 16 and the front-wheel differential mechanism 17.

As illustrated in FIG. 2, the transmission 18 includes an input shaft 20, a main transmission section 21, a forward/backward travel switching device 23, a gear mechanism 24, and a front-wheel power transmission section 25. The input shaft 20 is disposed at a front portion of the transmission case 12 and configured to receive motive power from the output shaft 4a of the engine 4. The main transmission section 21 is configured to receive motive power from the input shaft 20, vary the motive power, and output the varied motive power. The forward/backward travel switching device 23 is configured to receive the motive power outputted from the main transmission section 21 and switch the rotation direction of the motive power between a forward-travel direction and a backward-travel direction. The gear mechanism 24 is configured to transmit the output from the forward/backward travel switching device 23 to the input shaft 16a of the rear-wheel differential mechanism 16. The front-wheel power transmission section 25 is configured to receive motive power outputted from the forward/backward travel switching device 23, vary the motive power, and output the varied motive power to the front-wheel differential mechanism 17.

As illustrated in FIG. 2, the main transmission section 21 includes a continuously variable transmission 28 and a planetary transmission 31 ("gear transmission"). The continuously variable transmission 28 is configured to receive motive power from the input shaft 20. The planetary transmission 31 is configured to receive motive power from the input shaft 20 and the output from the continuously variable transmission 28.

The continuously variable transmission 28 is of a hydraulic type (that is, a hydrostatic transmission or HST), and includes a hydraulic pump P with a variable capacity and a hydraulic motor M. The continuously variable transmission 28 is configured to vary motive power from the input shaft 20 into normal-direction motive power or reverse-direction motive power in accordance with the swash plate angle of the hydraulic pump P. The continuously variable transmission 28 is also configured to continuously vary the rotation speed (that is, the number of revolutions) of the normal-direction motive power or reverse-direction motive power in accordance with the swash plate angle and output the resulting motive power from its motor shaft 28b. As illustrated in FIG. 2, the continuously variable transmission 28 includes a pump shaft 28a coupled to the hydraulic pump P as well as to the input shaft 20 with a rotary shaft 26 and a first gear mechanism 27 in-between. The input shaft 20 is coupled to a front end portion of the rotary shaft 26, which has a back end portion coupled to the first gear mechanism 27, which is then coupled to the pump shaft 28a. The hydraulic motor M is configured to output to the motor shaft 28b motive power corresponding to pressure oil supplied from the hydraulic pump P.

Figure 3:
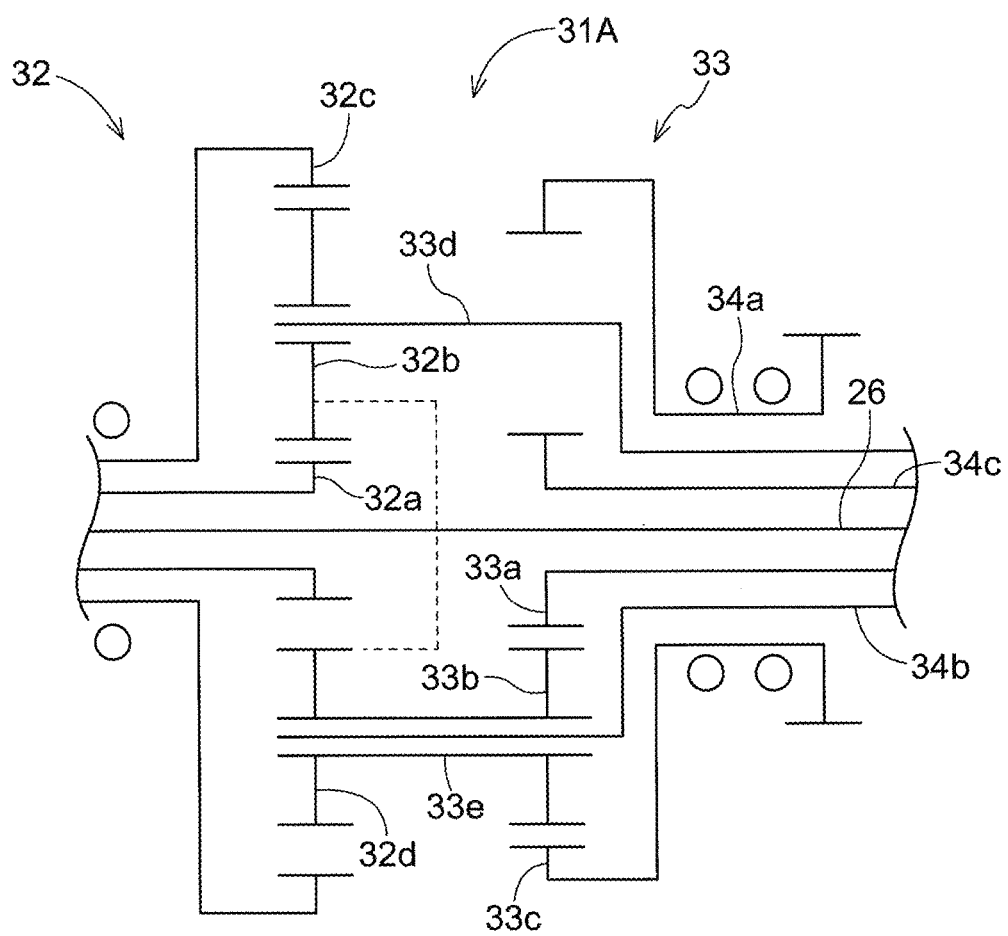
FIG. 3 is a diagram schematically illustrating an example configuration of a planetary transmission section.

As illustrated in FIG. 2, the planetary transmission 31 includes a planetary transmission unit 31A and an output section 31B. The planetary transmission unit 31A is configured to receive motive power from the input shaft 20 and the output from the continuously variable transmission 28. The output section 31B is configured to receive motive power from the planetary transmission unit 31A and output the motive power in one of four speed ranges. As illustrated in FIGS. 2 and 3, the planetary transmission unit 31A includes a first planetary transmission section 32 and a second planetary transmission section 33 backward of the first planetary transmission section 32. The first planetary transmission section 32 includes (i) a first sun gear 32a, (ii) a first planetary gear 32b meshing with the first sun gear 32a, and (iii) a first ring gear 32c including inner teeth meshing with the first planetary gear 32b. The second planetary transmission section 33 includes (i) a second sun gear 33a, (ii) a second planetary gear 33b meshing with the second sun gear 33a, (iii) a second ring gear 33c including inner teeth meshing with the second planetary gear 33b, and (iv) a second carrier 33d holding the second planetary gear 33b.

As illustrated in FIG. 2, the main transmission section 21 includes a second gear mechanism 30 extending from the first sun gear 32a to the motor shaft 28b of the continuously variable transmission 28 and configured to transmit the output from the continuously variable transmission 28 to the first sun gear 32a. The main transmission section 21 includes a third gear mechanism 29 extending from the first ring gear 32c to the input shaft 20 and configured to transmit motive power from the input shaft 20 to the first ring gear 32c. As illustrated in FIGS. 2 and 3, the first planetary transmission section 32 includes an interlocking gear 32d meshing with the first planetary gear 32b and coupled in an interlocked manner to the second planetary gear 33b with use of a coupler 33e. The first and second planetary transmission sections 32 and 33 define a so-called compound planetary transmission section.

As illustrated in FIGS. 2 and 3, the output section 31B includes a first input shaft 34a, a second input shaft 34b, and a third input shaft 34c in a triple-shaft structure as well as an output shaft 35 parallel to, for example, the first input shaft 34a. The first input shaft 34a is coupled to the second ring gear 33c. The second input shaft 34b is coupled to the second carrier 33d. The third input shaft 34c is coupled to the second sun gear 33a. The first input shaft 34a is coupled to a first range gear mechanism 36a. The main transmission section 21 includes a first clutch CL1 extending from the first range gear mechanism 36a to the output shaft 35. The third input shaft 34c is coupled to a second range gear mechanism 36b. The main transmission section 21 includes a second clutch CL2 extending from the second range gear mechanism 36b to the output shaft 35. The second input shaft 34b is coupled to a third range gear mechanism 36c. The main transmission section 21 includes a third clutch CL3 extending from the third range gear mechanism 36c to the output shaft 35. The third input shaft 34c is coupled to a fourth range gear mechanism 36d. The main transmission section 21 includes a fourth clutch CL4 extending from the fourth range gear mechanism 36d to the output shaft 35.

The main transmission section 21 is configured as follows: The motive power output from the engine 4 transmits through the input shaft 20, the rotary shaft 26, and the first gear mechanism 27 to the hydraulic pump P of the continuously variable transmission 28. The continuously variable transmission 28 outputs the motive power from its motor shaft 28b as normal-direction motive power or reverse-direction motive power. The continuously variable transmission 28 continuously varies the rotation speed (that is, the number of revolutions) of the normal-direction motive power or reverse-direction motive power. The continuously variable transmission 28 transmits the motive power through the second gear mechanism 30 to the first sun gear 32a of the first planetary transmission section 32. The engine 4 transmits motive power through the input shaft 20 and the third gear mechanism 29 to the first ring gear 32c of the first planetary transmission section 32. The first and second planetary transmission sections 32 and 33 composite (i) the motive power outputted from the continuously variable transmission 28 to the first ring gear 32c and (ii) the motive power outputted from the engine 4 to the first ring gear 32c. The second planetary transmission section 33 transmits the composite motive power to the output section 31B, which then outputs the composite motive power from its output shaft 35.

The main transmission section 21 is preferably structured and configured in the following manner. With the first clutch CL1 engaged, the composite motive power as composited by the planetary transmission unit 31A is varied by the first range gear mechanism 36a and first clutch CL1 of the output section 31B into motive power in the first-gear range. The motive power in the first-gear range is transmitted from the second ring gear 33c to the first input shaft 34a of the output section 31B. In this state, the motive power in the first-gear range is continuously varied through the operation of the continuously variable transmission 28, and is outputted from the output shaft 35.

With the second clutch CL2 engaged, the composite motive power as composited by the planetary transmission unit 31A is varied by the second range gear mechanism 36b and second of the output section 31B into motive power in the second-gear range. The motive power in the second-gear range is transmitted from the second sun gear 33a to the third input shaft 34c of the output section 31B. During this operation, the motive power in the second-gear range is continuously varied through the variation of the continuously variable transmission 28, and is outputted from the output shaft 35.

With the third clutch CL3 engaged, the composite motive power as composited by the planetary transmission unit 31A is varied by the third range gear mechanism 36c and third clutch CL3 of the output section 31B into motive power in the third-gear range. The motive power in the third-gear range is transmitted from the second carrier 33d to the second input shaft 34b of the output section 31B. During this operation, the motive power in the third-gear range is continuously varied through the variation of the continuously variable transmission 28, and is outputted from the output shaft 35.

With the fourth clutch CL4 engaged, the composite motive power as composited by the planetary transmission unit 31A is varied by the fourth range gear mechanism 36d and fourth clutch CL4 of the output section 31B into motive power in the fourth-gear range. The motive power in the fourth-gear range is transmitted from the second sun gear 33a to the third input shaft 34c of the output section 31B. During this operation, the motive power in the fourth-gear range is continuously varied through the variation of the continuously variable transmission 28, and is outputted from the output shaft 35.

As illustrated in FIG. 2, the forward/backward travel switching device 23 includes an input shaft 23a, an output shaft 23b, a forward-travel gear interlocking mechanism 23c, and a backward-travel gear interlocking mechanism 23d. The input shaft 23a is coupled to the output shaft 35 of the planetary transmission 31. The output shaft 23b is parallel to the input shaft 23a. The input shaft 23a is provided with a forward clutch CLF and a reverse clutch CLR. The forward-travel gear interlocking mechanism 23c extends from the forward clutch CLF to the output shaft 23b. The backward-travel gear interlocking mechanism 23d extends from the reverse clutch CLR to the output shaft 23b.

Engaging the forward clutch CLF couples the input shaft 23a to the forward-travel gear interlocking mechanism 23c. This achieves a forward-travel power transmission state, in which motive power from the input shaft 23a is transmitted through the forward-travel gear interlocking mechanism 23c to the output shaft 23b. Engaging the reverse clutch CLR couples the input shaft 23a to the backward-travel gear interlocking mechanism 23d. This achieves a backward-travel power transmission state, in which motive power from the input shaft 23a is transmitted through the backward-travel gear interlocking mechanism 23d to the output shaft 23b.

The forward/backward travel switching device 23 receives the output from the planetary transmission 31 at the input shaft 23a. Engaging the forward clutch CLF causes motive power from the input shaft 23a to be converted by the forward clutch CLF and the forward-travel gear interlocking mechanism 23c into forward-travel motive power to be transmitted to the output shaft 23b. Engaging the reverse clutch CLR causes motive power from the input shaft 23a to be converted by the reverse clutch CLR and the backward-travel gear interlocking mechanism 23d into backward-travel motive power to be transmitted to the output shaft 23b. The output shaft 23b transmits the forward-travel motive power and backward-travel motive power through the gear mechanism 24 to the rear-wheel differential mechanism 16 and the front-wheel power transmission section 25.

The rear-wheel differential mechanism 16 receives the forward-travel motive power or backward-travel motive power from the forward/backward travel switching device 23, and transmits the motive power from a pair of left and right output shafts 16b to the respective rear wheels 2. The left output shaft 16b transmits its motive power through a planetary deceleration mechanism 37 to the left rear wheel 2. The left output shaft 16b is provided with a steering brake 38. The right output shaft 16b transmits its motive power to the right rear wheel 2 in a system including a planetary deceleration mechanism 37 and a steering brake 38 (not illustrated in the drawing) similarly to the power transmission system for the left rear wheel 2. The body 3 (see FIG. 1) is easily turnable in accordance with how each steering brake 38 is operated.

As illustrated in FIG. 2, the front-wheel power transmission section 25 includes an input shaft 25a and an output shaft 25b. The input shaft 25a is coupled to the output shaft 24a of the gear mechanism 24. The output shaft 25b is parallel to the input shaft 25a. The input shaft 25a is provided with a constant-rate clutch CLT and a rate-increasing clutch CLH backward of the constant-rate clutch CLT. The front-wheel power transmission section 25 includes a constant-rate gear mechanism 40 extending from the constant-rate clutch CLT to the output shaft 25b and a rate-increasing gear mechanism 41 extending from the rate-increasing clutch CLH to the output shaft 25b. The output shaft 24a of the gear mechanism 24 is provided with a parking brake 39.

The front-wheel power transmission section 25 is configured as follows: Engaging the constant-rate clutch CLT causes motive power from the input shaft 25a to be transmitted through the constant-rate clutch CLT and the constant-rate gear mechanism 40 to the output shaft 25b. The constant-rate gear mechanism 40 achieves a constant-rate power transmission state, in which the output shaft 25b outputs motive power for driving the front wheels 1 such that the front wheels 1 have a circumferential speed equal to that of the rear wheels 2. Engaging the rate-increasing clutch CLH causes motive power from the input shaft 25a to be transmitted through the rate-increasing clutch CLH and the rate-increasing gear mechanism 41 to the output shaft 25b. The rate-increasing gear mechanism 41 achieves a front-wheel rate-increasing power transmission state, in which the output shaft 25b outputs motive power for driving the front wheels 1 such that the front wheels 1 have a circumferential speed higher than that of the rear wheels 2. The output from the output shaft 25b is received by the front-wheel differential mechanism 17 through a rotary shaft 42 coupling the output shaft 25b to the input shaft 17a of the front-wheel differential mechanism 17.

The body 3 (see FIG. 1) is configured as follows: Engaging the constant-rate clutch CLT leads to a four-wheel drive mode in which the front and rear wheels 1 and 2 are driven such that the front wheels 1 have an average circumferential speed equal to that of the rear wheels 2. Engaging the rate-increasing clutch CLH leads to a four-wheel drive mode in which the front and rear wheels 1 and 2 are driven such that the front wheels 1 have an average circumferential speed higher than that of the rear wheels 2. Engaging the rate-increasing clutch CLH allows the body 3 to turn with a radius smaller than when the constant-rate clutch CLT is engaged.

Figure 4:
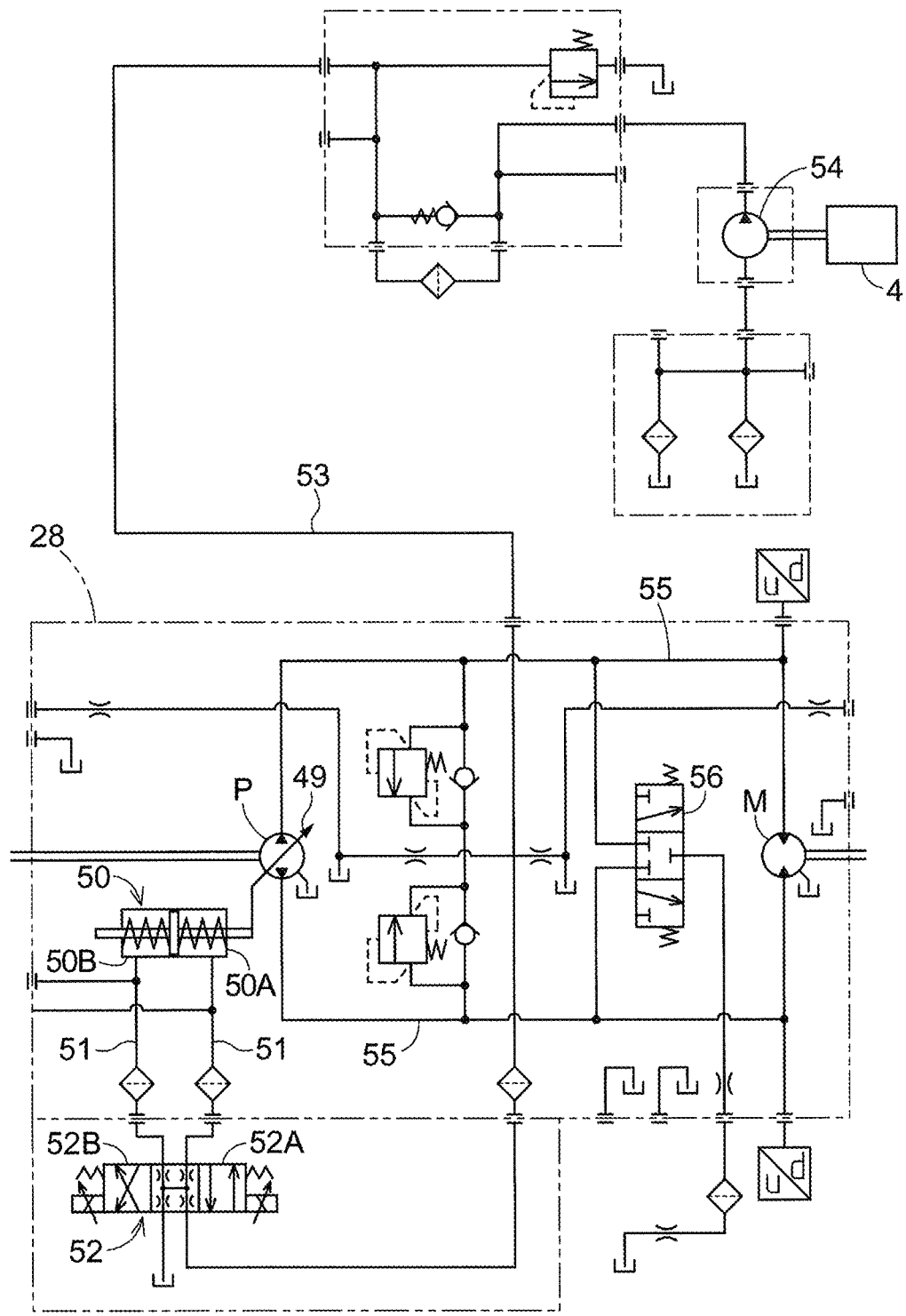
FIG. 4 is a hydraulic circuit diagram illustrating an example continuously variable transmission and an example structure for operating the continuously variable transmission.

The continuously variable transmission 28 is controlled by the hydraulic circuit illustrated in FIG. 4 as an example. The hydraulic circuit includes a hydraulic cylinder 50, a speed change valve unit 52 including electromagnetically operated valves, and a hydraulic pump 54. The continuously variable transmission 28 is controlled based on a change ("tilt") in the angle ("swash plate angle") of a swash plate 49 ("pump swash plate") of the hydraulic pump P, and outputs from the hydraulic motor M motive power corresponding to the swash plate angle of the hydraulic pump P. The swash plate 49 is controlled based on the amount of operating oil supplied from the hydraulic pump 54 through the hydraulic cylinder 50 and the pressure of the operating oil ("operating oil pressure"). The operating oil supplied (or discharged) from the hydraulic cylinder 50 is controlled by the speed change valve unit 52.

As illustrated in FIG. 4, the hydraulic cylinder 50 is coupled to the swash plate 49. The hydraulic cylinder 50 includes two oil chambers 50A and 50B. The speed change valve unit 52 is connected to the hydraulic cylinder 50 through an operating oil path 51, and controls the hydraulic cylinder 50 to cause the hydraulic cylinder 50 to discharge operating oil to the hydraulic pump P. The hydraulic pump 54 is connected to the speed change valve unit 52 through a supply oil path 53. The hydraulic pump P is connected to the hydraulic motor M through a drive oil path 55 connected to an emergency relief valve 56.

The hydraulic circuit is configured such that the speed change valve unit 52 is switchable to cause operating oil from the hydraulic pump 54 to be supplied from either of the two oil chambers of the hydraulic cylinder 50. The speed change valve unit 52 includes a first electromagnetic valve 52A and a second electromagnetic valve 52B. The first electromagnetic valve 52A is configured to cause operating oil to be discharged from the oil chamber 50A to the normal rotation side of the neutral position. The second electromagnetic valve 52B is configured to cause operating oil to be discharged from the oil chamber 50 B to the reverse rotation side of the neutral position. As described above, the first and second electromagnetic valves 52A and 52B are each switched across the neutral position of the swash plate 49 (that is, the neutral state of the continuously variable transmission 28) so that the swash plate 49 is tilted to an inclination angle corresponding to the respective positions of the first and second electromagnetic valves 52A and 52B as operated, thereby operating the continuously variable transmission 28.

Figure 5:
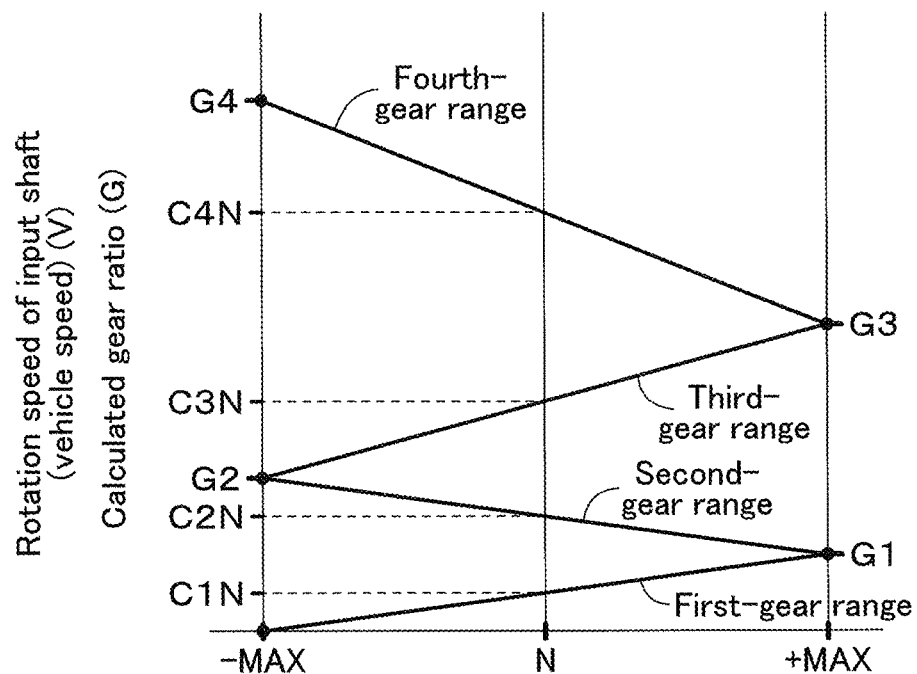
FIG. 5 is a graph that shows how the vehicle speed is changed with use of a speed change controller.

With reference to FIGS. 2 and 5, the description below deals with how the main transmission section 21 is configured to change the vehicle speed. FIG. 5 shows a vertical axis indicative of the calculated gear ratio G ("current gear ratio") and the rotation speed V of the input shaft 16a (which corresponds to the vehicle speed). The calculated gear ratio G refers to the ratio of the number of revolutions of the input shaft 16a to the number of revolutions of the input shaft 20. FIG. 5 shows a horizontal axis indicative of how the continuously variable transmission 28 is varied. The symbol "N" indicates the neutral state. The symbol "−MAX" indicates that the continuously variable transmission 28 has been varied to output reverse-direction motive power for the maximum speed (that is, the largest swash plate angle for the reverse rotation). The symbol "+MAX" indicates that the continuously variable transmission 28 has been varied to output normal-direction motive power for the maximum speed (that is, the largest swash plate angle for the normal rotation). The symbols "G1", "G2", "G3", and "G4" refer to preset gear ratios.

Varying the continuously variable transmission 28 from −MAX toward +MAX with the first clutch CL1 engaged increases the rotation speed V in the first-gear range continuously from zero speed. Within the first-gear range, the calculated gear ratio G is C1N with the continuously variable transmission 28 in the neutral state. In response to the calculated gear ratio G reaching G1, speed change controller 48 disengages the first clutch CL1 and engages the second clutch CL2. Varying the continuously variable transmission 28 from +MAX toward −MAX with the second clutch CL2 engaged increases the rotation speed V in the second-gear range continuously. Within the second-gear range, the calculated gear ratio G is C2N with the continuously variable transmission 28 in the neutral state. In response to the calculated gear ratio G reaching G2, the speed change controller 48 disengages the second clutch CL2 and engages the third clutch CL3. Varying the continuously variable transmission 28 from −MAX toward +MAX with the third clutch CL3 engaged increases the rotation speed V in the third-gear range continuously. Within the third-gear range, the calculated gear ratio G is C3N with the continuously variable transmission 28 in the neutral state. In response to the calculated gear ratio G reaching G3, the speed change controller 48 disengages the third clutch CL3 and engages the fourth clutch CL4. Varying the continuously variable transmission 28 from +MAX toward −MAX with the fourth clutch CL4 engaged increases the rotation speed V in the fourth-gear range continuously. Within the fourth-gear range, the calculated gear ratio G is C4N with the continuously variable transmission 28 in the neutral state.

Figure 6:
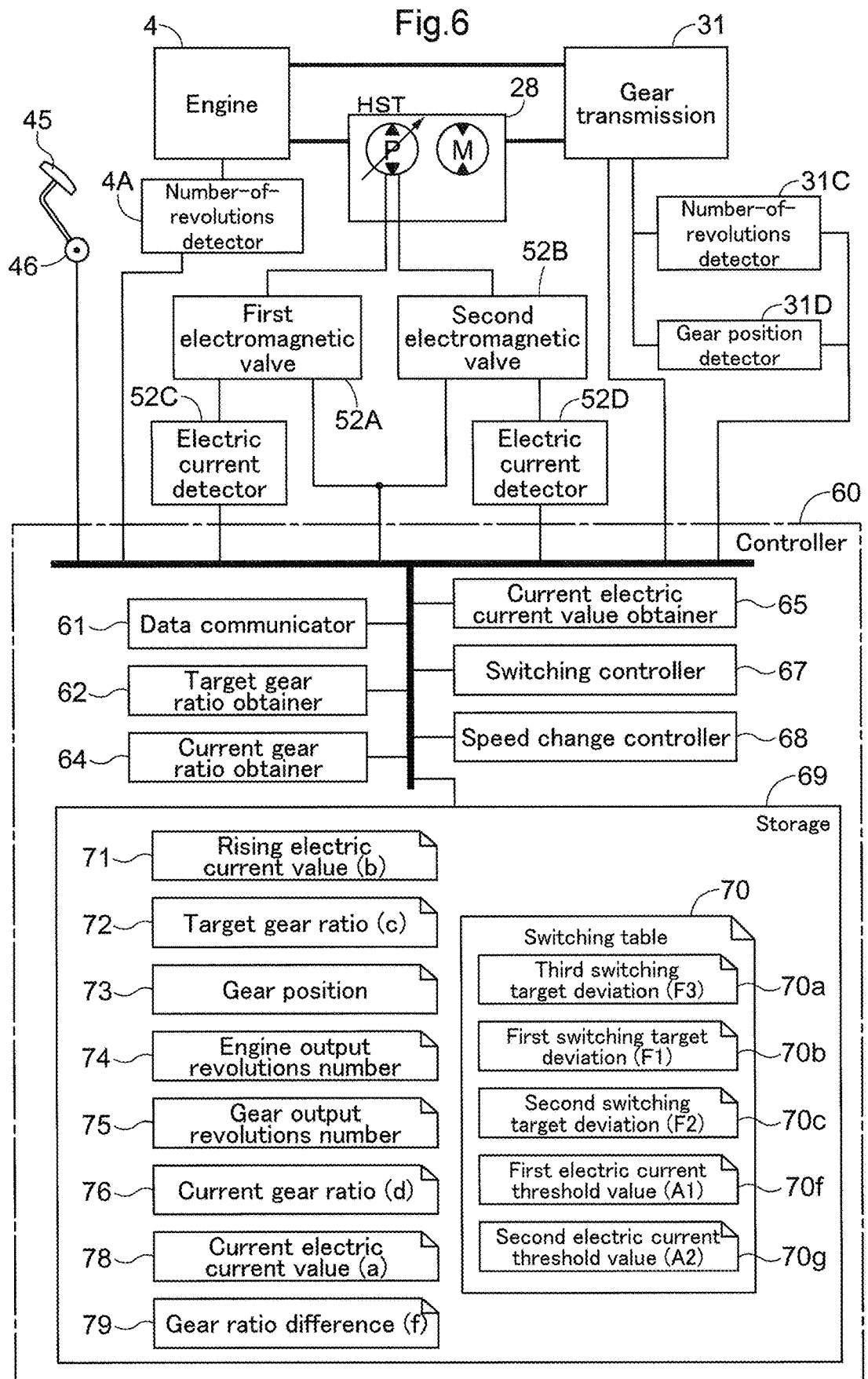
FIG. 6 is a diagram illustrating an example configuration for electromagnetic valve switching control.
Figure 7:
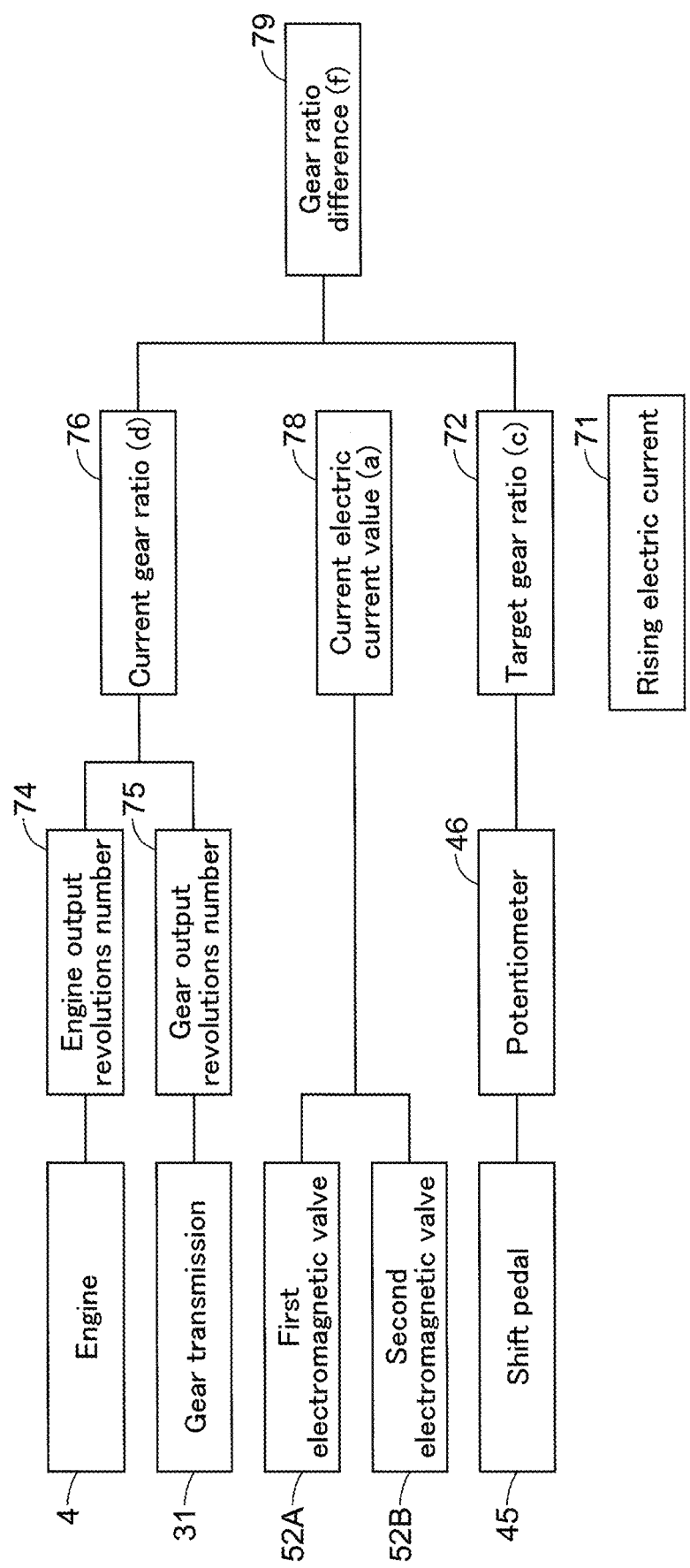
FIG. 7 is a diagram illustrating example information for use in electromagnetic valve switching control.

With reference to FIGS. 1, 2, and 6, the description below deals with how speed change is controlled.

The driver 6 includes, for example, a shift pedal 45 as a speed change operation tool for varying the continuously variable transmission 28. The driver 6 includes a potentiometer 46 configured to detect the position of the shift pedal 45 as operated. The present preferred embodiment, which includes a potentiometer 46, may alternatively include any of various position detecting mechanisms such as a mechanism including a detection switch.

The tractor includes a controller 60 configured to control the speed change operation based on the shift pedal 45 as operated. The controller 60 includes a processor such as a central processing unit (CPU) or electronic control unit (ECU). The controller 60 is linked to the continuously variable transmission 28 with the first electromagnetic valve 52A or second electromagnetic valve 52B in-between. The controller 60 is also linked to the first to fourth clutches CL1 to CL4 of the planetary transmission 31 ("gear transmission"). The controller 60 is configured to detect based on information detected by the potentiometer 46 that the shift pedal 45 has been operated and vary the continuously variable transmission 28. During this operation, the controller 60 switches the speed change valve unit 52 for controlling the swash plate angle between the first and second electromagnetic valve 52A and 52B each time the swash plate 49 of the hydraulic pump P is tilted across the neutral position ("electromagnetic valve switching control"). The controller 60 is also configured to control how the first to fourth clutches CL1 to CL4 are switched.

The controller 60 is linked to a number-of-revolutions detector 4A, a number-of-revolutions detector 31C, a gear position detector 31D, an electric current detector 52C, and an electric current detector 52D.

The number-of-revolutions detector 4A is configured to detect the number of revolutions of the engine 4 (that is, an engine output revolutions number 74) and transmit information on the number of revolutions of the engine 4 to the controller 60. The number-of-revolutions detector 31C is configured to detect the number of output revolutions of the transmission 18 (that is, a gear output revolutions number 75) and transmit information on the number of revolutions of the transmission 18 to the controller 60. The number-of-revolutions detector 31C may be configured to, for instance, detect the number of revolutions of the input shaft 16a of the rear-wheel differential mechanism 16 or the number of revolutions of the output shaft 35 of the planetary transmission 31 ("gear transmission"). The number-of-revolutions detector 31C may, if configured to detect the number of revolutions of the input shaft 16a, detect the number of revolutions of a power transmission gear 63 provided for the input shaft 16a.

The gear position detector 31D is configured to detect the current speed range, that is, which of the first to fourth clutches CL1 to CL4 is engaged, and transmit information on the result of the detection to the controller 60.

The electric current detector 52C is configured to measure the value of electric current ("control signal") inputted to the first electromagnetic valve 52A and transmit information on the electric current value to the controller 60. The electric current detector 52D is configured to measure the value of electric current ("control signal") inputted to the second electromagnetic valve 52B and transmit information on the electric current value to the controller 60.

The controller 60 functions as an electromagnetic valve control device configured to, as part of the operation of varying the continuously variable transmission 28, perform electromagnetic valve switching control, that is, switch the first and second electromagnetic valves 52A and 52B on and off, based on information that the controller 60 has obtained from components such as the number-of-revolutions detector 4A and a switching table 70. The controller 60 is also configured to select an electric current value to be transmitted to the first electromagnetic valve 52A or second electromagnetic valve 52B having been switched on and output information on the electric current value to the first electromagnetic valve 52A or second electromagnetic valve 52B.

With reference to FIGS. 1, 2, and 6 to 8, the description below deals with a configuration to perform electromagnetic valve switching control.

The controller 60 includes a data communicator 61, a target gear ratio obtainer 62, a current gear ratio obtainer 64, an current electric current value obtainer 65, a switching controller 67, and a storage 69. The controller 60 also includes a speed change controller 68 configured to control the speed change together with the switching controller 67.

The data communicator 61 is connected to elements such as the potentiometer 46, the number-of-revolutions detectors 4A and 31C, the gear position detector 31D, and the electric current detectors 52C and 52D in such a manner as to be capable of data communication. The data communicator 61 is also configured to transmit a control signal to elements such as the first and second electromagnetic valves 52A and 52B and the planetary transmission 31 ("gear transmission").

The storage 69 stores in advance information on a rising electric current value 71 (hereinafter also indicated as "(b)") of each of the first and second electromagnetic valves 52A and 52B and the switching table 70. The rising electric current value 71 refers to the electric current value for a control signal at which value the gear ratio starts to change for each of the first and second electromagnetic valves 52A and 52B, and hence to the electric current value at which the swash plate 49 starts to become inclined (or tilted) from the neutral position. The rising electric current value 71, in other words, refers to the value of electric current at a time point at which a gradual increase in electric current starts to change the gear ratio and thereby move the swash plate 49 within each speed range.

The target gear ratio obtainer 62 is configured to obtain from the potentiometer 46 through the data communicator 61 information on the position of the shift pedal 45 as operated and calculate (or obtain) a target gear ratio 72 (hereinafter also indicated as "(c)") corresponding to the position. The target gear ratio obtainer 62 stores information on the target gear ratio 72 in the storage 69.

The current gear ratio obtainer 64 is configured to obtain through the data communicator 61 information on an engine output revolutions number 74 that the number-of-revolutions detector 4A has obtained and information on a gear output revolutions number 75 that the number-of-revolutions detector 31C has obtained and calculate the current gear ratio 76 (hereinafter also indicated as "(d)"). The current gear ratio obtainer 64 stores information on the current gear ratio 76 in the storage 69.

The current electric current value obtainer 65 is configured to obtain through the data communicator 61 information on the electric current value that the electric current detector 52C has detected and information on the electric current value that the electric current detector 52D has measured. The current electric current value obtainer 65 stores in the storage 69 information on the larger one of the two electric current values as a current electric current value 78 (hereinafter also indicated as "(a)"), which is the electric current value for a control signal with which the hydraulic pump P is being controlled. The current electric current value obtainer 65 stores the current electric current value 78 in association with information on whether the electric current value is as measured by the electric current detector 52C or the electric current detector 52D, that is, whether the electric current value is for a control signal on the normal rotation side or for a control signal on the reverse rotation side.

The switching controller 67 is configured to calculate the difference between the target gear ratio 72 and the current gear ratio 76 as a gear ratio difference 79 (hereinafter also indicated as "(f)") and store information on the gear ratio difference 79 in the storage 69. The switching controller 67 is also configured to perform electromagnetic valve switching control, that is, switch the first and second electromagnetic valves 52A and 52B on and off, based on the current electric current value 78 and the switching table 70. The switching controller 67 performs electromagnetic valve switching control based on, for example, the rising electric current value 71, the current electric current value 78, the gear ratio difference 79, and the switching table 70 as discussed later.

The storage 69 stores information on the current gear position 73 obtained from the gear position detector 31D through the data communicator 61. The gear position 73 corresponds to that clutch of the output section 31B which has been engaged and thus to the current speed range. Specifically, the gear position 73 of 1 corresponds to the first-gear range, in which the first clutch CL1 is engaged; the gear position 73 of 2 corresponds to the second-gear range, in which the second clutch CL2 is engaged; the gear position 73 of 3 corresponds to the third-gear range, in which the third clutch CL3 is engaged, and the gear position 73 of 4 corresponds to the fourth-gear range, in which the fourth clutch CL4 is engaged.

The rising electric current value 71 of each of the first and second electromagnetic valves 52A and 52B is determined in advance for each gear position 73 as below with the engine 4 having been warmed up and the transmission oil at about 50° C., for example, and is stored in the storage 69.

Figure 8:
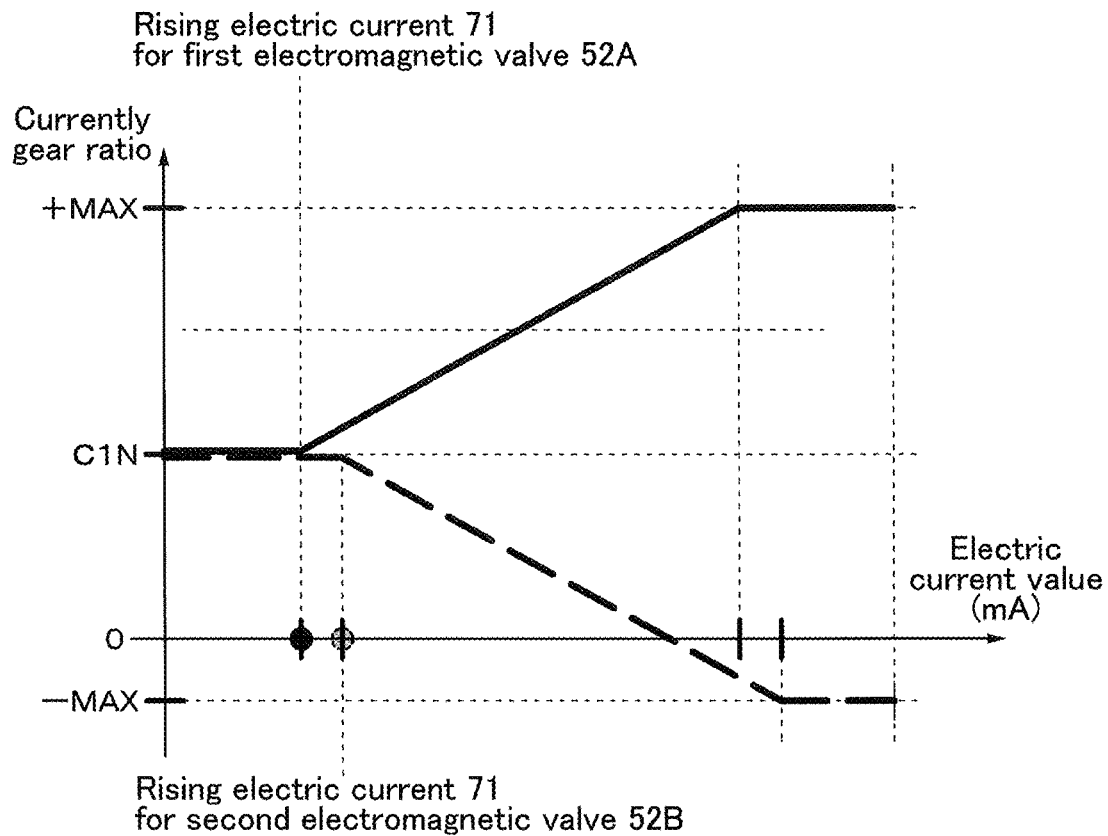
FIG. 8 is a graph that shows an example rising electric current value.

First, with the gear position 73 at 1, the target electric current value is, as illustrated in FIG. 8, gradually swept for the first electromagnetic valve 52A from the state in which the current gear ratio 76 is C1N with the continuously variable transmission 28 in the neutral state. This increases the current electric current value 78, and starts to change the current gear ratio 76 from the value indicative of the neutral position (C1N) at an electric current value. This value is used as the rising electric current value 71 of the first electromagnetic valve 52A, at which the swash plate 49 starts to tilt. A similar operation is then performed to determine the rising electric current value 71 of the second electromagnetic valve 52B. Further, the rising electric current value 71 of each of the first and second electromagnetic valves 52A and 52B is determined for each gear position 73 as the gear position 73 is switched. FIG. 8 shows a solid line to indicate how the current gear ratio changes in response to the target electric current value supplied to the first electromagnetic valve 52A and a broken line to indicate how the current gear ratio changes in response to the target electric current value supplied to the second electromagnetic valve 52B.

The switching table 70 stored in the storage 69 stores switching conditions for the electromagnetic valve switching control. The switching table 70 stores a first switching target deviation 70b (hereinafter also indicated as "(F1)"), a second switching target deviation 70c (hereinafter also indicated as "(F2)"), and a third switching target deviation 70a (hereinafter also indicated as "(F3)"), each of which is, among different switching threshold values for each engaged clutch (or gear position 73), a gear ratio difference threshold value and is determined in advance. The first to third switching target deviations 70b, 70c, and 70a are determined in advance for each gear position 73 based on, for example, the gear ratio with the continuously variable transmission 28 in the neutral state and the range of variation of the gear ratio. The third switching target deviation 70a is smaller than the second switching target deviation 70c, which is then smaller than the first switching target deviation 70b. As illustrated in FIG. 6, the switching table 70 also stores a first electric current threshold value 70f (hereinafter also indicated as "(A1)") and a second electric current threshold value 70g (hereinafter also indicated as "(A2)"), each of which is an electric current threshold value among the switching threshold values and is determined in advance. The switching table 70 may also store information on, for example, an expected gear ratio corresponding to the neutral position (or neutral point) of the continuously variable transmission 28, the range of variation in this gear ratio, and the width of this gear ratio as the width of the range of variation in the gear ratio.

With reference to FIGS. 1, 2, and 6 to 10, the description below deals with how the switching controller 67 operates for the electromagnetic valve switching control.

Figure 9:
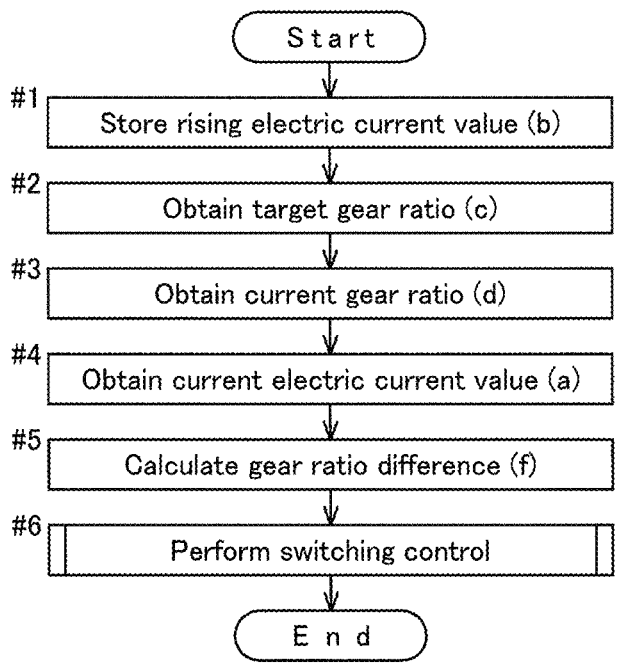
FIG. 9 is a flowchart illustrating an example flow of electromagnetic valve switching control.

As described above, the storage 69 stores information on the switching table 70 and the rising electric current value 71 determined in advance (step #1 in FIG. 9).

Then, the target gear ratio obtainer 62 continuously obtains information on the position of the shift pedal 45 as operated from the potentiometer 46 for the shift pedal 45 through the data communicator 61 for speed change control including the electromagnetic valve switching control while the tractor is traveling. The target gear ratio obtainer 62 calculates a target gear ratio 72 corresponding to the position and stores the target gear ratio 72 in the storage 69 (step #2 in FIG. 9).

The current gear ratio obtainer 64 continuously obtains information on an engine output revolutions number 74 from the number-of-revolutions detector 4A of the engine 4 through the data communicator 61. Similarly, the current gear ratio obtainer 64 continuously obtains information on a gear output revolutions number 75, which is the number of output revolutions of the planetary transmission 31, from the number-of-revolutions detector 31C of the planetary transmission 31 through the data communicator 61. The current gear ratio obtainer 64 divides the gear output revolutions number 75 by the engine output revolutions number 74 and multiplies the quotient by 10,000 to determine the current gear ratio 76. The current gear ratio obtainer 64 stores information on the current gear ratio 76 in the storage 69 (step #3 in FIG. 9). The current gear ratio obtainer 64 also obtains information on the current gear position 73 from the gear position detector 31D of the planetary transmission 31 through the data communicator 61 and stores the information in the storage 69.

The current electric current value obtainer 65 continuously obtains from the electric current detectors 52C and 52D through the data communicator 61 information on the electric current value for a control signal to be transmitted to the first and second electromagnetic valves 52A and 52B. The controller 60 determines which electromagnetic valve is being used to control the swash plate 49 of the continuously variable transmission 28 and stores in the storage 69 as the current electric current value 78 information on the value of electric current being inputted to that electromagnetic valve (step #4 in FIG. 9).

Steps #2 to #4 in FIG. 9 are carried out while the tractor is traveling or the engine 4 is running, and are not necessarily carried out in this order.

Next, the switching controller 67 determines the difference between the target gear ratio 72 and the current gear ratio 76 as a gear ratio difference 79 and stores information on the gear ratio difference 79 in the storage 69 (step #5 in FIG. 9). The gear ratio difference 79 is the absolute value of the difference.

Then, the switching controller 67 performs electromagnetic valve switching control based on the switching table 70, the rising electric current value 71, the current electric current value 78, and the gear ratio difference 79 (step #6 in FIG. 9). Specifically, the switching controller 67 performs electromagnetic valve switching control, that is, switches the first and second electromagnetic valves 52A and 52B on and off, as a result of determining based on the current gear position 73 how close to the rising electric current value 71 the current electric current value 78 has decreased and how apart from the target gear ratio 72 the current gear ratio 76 has become.

Performing the above control makes it possible to detect how the swash plate 49 is tilted, based on the axle load with use of the difference between the current electric current value 78 and the rising electric current value 71. Further, the relationship between the target gear ratio 72 and the current gear ratio 76 makes it possible to determine whether the continuously variable transmission 28 is being controlled such that the swash plate 49 is moved to the neutral position or such that the swash plate 49 is moved beyond the neutral position and tilted in an accelerated manner. Performing the electromagnetic valve switching control based on how the swash plate 49 has been tilted based on the axle load prevents the first and second electromagnetic valves 52A and 52B from being switched in a delayed manner and allows the first and second electromagnetic valves 52A and 52B to be switched smoothly. If the continuously variable transmission 28 is being controlled such that the swash plate 49 is moved beyond the neutral position and tilted in an accelerated manner, the above configuration makes it possible to switch the first and second electromagnetic valves 52A and 52B early. The above control thereby allows the electromagnetic valves to be switched in a timely manner.

The description below deals with the electromagnetic valve switching control in detail.

First, the switching controller 67 subtracts the rising electric current value 71 from the current electric current value 78 to give a difference and determines whether (a)−(b)≤(A1), that is, whether the difference is not larger than a predetermined first electric current threshold value 70f stored in the switching table 70 (step #61 in FIG. 10). The first electric current threshold value 70f is, for example, about 20 mA.

If the switching controller 67 has determined that the difference is not larger than the first electric current threshold value 70f (yes in step #61 in FIG. 10), the switching controller 67 determines that the current electric current value 78 is close to the rising electric current value 71 to some extent. The switching controller 67 then stores information on the gear ratio difference 79 in the switching table 70 based on the current gear position 73, and determines whether (f)≥(F1), that is, whether the gear ratio difference 79 is not smaller than a predetermined first switching target deviation 70b corresponding to the gear position 73 (step #62 in FIG. 10).

If the switching controller 67 has determined that the gear ratio difference 79 is not smaller than the first switching target deviation 70b (yes in step #62 in FIG. 10), the switching controller 67 performs electromagnetic valve switching control, that is, switches off the engaged one of the first and second electromagnetic valves 52A and 52B and switches on the disengaged one thereof (step #63 in FIG. 10).

With the current electric current value 78 close to the rising electric current value 71 and the gear ratio difference 79 large over some extent, performing electromagnetic valve switching control after the current electric current value 78 has reached the rising electric current value 71 would not easily bring the gear ratio to an appropriate value. The above configuration allows the switching controller 67 to perform electromagnetic valve switching control before the current electric current value 78 reaches the rising electric current value 71, and thereby allows the switching controller 67 to switch the electromagnetic valves in a timely manner and bring the gear ratio to an appropriate value early.

If the switching controller 67 has determined in step #62 that the gear ratio difference 79 is smaller than the first switching target deviation 70*b* (no in step #62 in FIG. 10), the switching controller 67 determines whether (a)≤(b), that is, whether the current electric current value 78 is not larger than the rising electric current value 71 (step #64 in FIG. 10).

If the switching controller 67 has determined that the current electric current value 78 is not larger than the rising electric current value 71 (yes in step #64 in FIG. 10), the switching controller 67 subtracts the current electric current value 78 from the rising electric current value 71 to give a difference and determines whether (b)−(a)≤(A2), that is, whether the difference is not larger than a predetermined second electric current threshold value 70*g* stored in the switching table 70 (step #65 in FIG. 10). The second electric current threshold value 70*g* is, for example, about 40 mA.

If the switching controller 67 has determined that the difference is not larger than the second electric current threshold value 70*g* (yes in step #65 in FIG. 10), the switching controller 67 determines based on the current gear position 73 whether the gear ratio difference 79 is not smaller than a third switching target deviation 70*a*, which is smaller than the first switching target deviation 70*b* (step #66 in FIG. 10).

If the switching controller 67 has determined that the gear ratio difference 79 is not smaller than the third switching target deviation 70*a* (yes in step #66 in FIG. 10), the switching controller 67 performs electromagnetic valve switching control (step #63 in FIG. 10).

As described above, with the current electric current value 78 close to the rising electric current value 71 to some extent and the gear ratio difference 79 relatively small, the switching controller 67 performs electromagnetic valve switching control even if the current electric current value 78 has not reached the rising electric current value 71. The switching controller 67, in other words, needs to switch the electromagnetic valves if the current electric current value 78 is close to the rising electric current value 71 to some extent and the gear ratio difference 79 is large to some extent, as well as if the current electric current value 78 is below the rising electric current value 71. As discussed later, if the switching controller 67 were configured to switch the electromagnetic valves in response to the gear ratio difference 79 being very small (that is, not larger than the third switching target deviation 70*a*), the switching controller 67 would be switching the electromagnetic valves frequently due to load variation and the continuously variable transmission 28 being incapable of moving so subtly near the neutral position. The switching controller 67 is thus configured to avoid switching the electromagnetic valves in response to the gear ratio difference 79 being very small (that is, not larger than the third switching target deviation 70*a*). This allows the switching controller 67 to switch the electromagnetic valves in a timely manner and bring the gear ratio to an appropriate value early.

If the switching controller 67 has determined in step #66 that the gear ratio difference 79 is smaller than the third switching target deviation 70*a* (no in step #66 in FIG. 10), the switching controller 67 avoids performing electromagnetic valve switching control, and operates to retain the current electric current value 78 (step #67 in FIG. 10).

With the current electric current value 78 decreased to close to the rising electric current value 71 and the gear ratio difference 79 relatively small, the swash plate 49 may not become much tilted due to the small current electric current value 78. Thus, the switching controller 67, in the above state, retains the current electric current value 78 and then resumes electromagnetic valve switching control in response to the gear ratio difference 79 increasing by not smaller than a predetermined value. This allows the electromagnetic valves to be switched in a timely manner.

If the switching controller 67 has determined in step #65 that the difference is larger than the second electric current threshold value 70*g* (no in step #65 in FIG. 10), the switching controller 67 determines based on the current gear position 73 whether the gear ratio difference 79 is not smaller than a second switching target deviation 70*c*, which is larger than the third switching target deviation 70*a* and smaller than the first switching target deviation 70*b* (step #68 in FIG. 10).

If the switching controller 67 has determined that the gear ratio difference 79 is not smaller than the second switching target deviation 70*c* (yes in step #68 in FIG. 10), the switching controller 67 performs electromagnetic valve switching control (step #63 in FIG. 10).

As described above, the switching controller 67 performs electromagnetic valve switching control if (i) the current electric current value 78 is not larger than the rising electric current value 71 and simultaneously (ii) the gear ratio difference 79 is not smaller than the second switching target deviation 70*c*. This allows the switching controller 67 to switch the electromagnetic valves in response to the current gear ratio 76 being apart from the target gear ratio 72 by not smaller than a predetermined value even if the current electric current value 78 has not reached the rising electric current value 71. This in turn allows the electromagnetic valves to be switched appropriately.

If no in steps #61, #64, and #68, the switching controller 67 restarts the process from step #61.

Alternative Preferred Embodiments

The preferred embodiments described above may be configured such that the switching controller 67 avoids switching the electromagnetic valves over a predetermined time period after once switching the electromagnetic valves even if the switching conditions are satisfied. The predetermined time period is, for example, about 150 milliseconds. That is, it is determined whether a predetermined time has elapsed since the electromagnetic valve was switched immediately before, and only when the predetermined time has elapsed, the switching controller 67 subtracts the rising electric current value 71 from the current electric current value 78 to give a difference and determines whether (a)−(b)≤(A1), that is, whether the difference is not larger than a predetermined first electric current threshold value 70*f* (step #61 in FIG. 10).

The switch of the electromagnetic valves is followed by input of a control signal (or electric current value) into the electromagnetic valves with a time lag in-between. Further, the switch of the electromagnetic valves is followed by the start of the tilt of the swash plate 49 with a time lag in-between. If the switching conditions are satisfied again immediately after the switching controller 67 has switched the electromagnetic valves, the switching controller 67 will switch the electromagnetic valves again accordingly. This may lead to a control signal (or electric current value) being inputted inappropriately or to the swash plate 49 being tilted inappropriately. Further, switching the electromagnetic valves repeatedly at short intervals may lead to unstable operation of the continuously variable transmission 28.

With the above configuration, the switching controller 67 avoids performing electromagnetic valve switching control over a predetermined time period after once switching the electromagnetic valves. This ensures appropriate input of a control signal (or electric current value), appropriate tilt of the swash plate 49, and stable operation of the continuously variable transmission 28.

For each of the preferred embodiments described above, the switching table 70 does not necessarily store the three switching threshold values of the first to third switching target deviations 70b, 70c, and 70a as switching threshold values (that is, gear ratio difference threshold values), and may store one, two, or four or more switching threshold values. The switching controller 67, in this case as well, performs electromagnetic valve switching control for each gear position 73 in correspondence with how the current electric current value 78 and the rising electric current value 71 are related to their respective switching threshold values.

The switching controller 67 is thus capable of performing electromagnetic valve switching control appropriately according to, for example, the surroundings of the transmission 18 or the current state of the environment.

For each of the preferred embodiments described above, the switching threshold values are not necessarily stored in the switching table 70, and may be in the form of a function involving the current electric current value 78 and the rising electric current value 71 for each gear position 73. The function may be set by, for example, linearly interpolating a predetermined value.

The above configuration allows the switching controller 67 to perform electromagnetic valve switching control more easily.

For each of the preferred embodiments described above, the controller 60 does not necessarily include functional blocks such as the above, and may include any functional blocks. The functional blocks of the controller 60 may, for instance, each be divided further, or a portion of or the entire functional block may be combined with another functional block. The functions of the controller 60 are not necessarily performed by the above functional blocks, and may each be performed by any functional block. Further, one or more or all of the functions of the controller 60 may be performed by software. Programs as such software are stored in a storage device such as the storage 69 and executed by a processor included in the controller 60 such as a CPU or a separate processor.

The preferred embodiments described above are each configured such that the planetary transmission 31 outputs composite motive power in one of four speed ranges, for example. The planetary transmission 31 may alternatively output composite motive power in one of three or less or five or more speed ranges.

The preferred embodiments described above are each an example including front and rear wheels 1 and 2. The tractor may alternatively include as its travel device a crawler travel device or a combination of a mini crawler and wheels.

The preferred embodiments described above are each an example including a shift pedal 45. The present invention is, however, not limited to such a configuration. The tractor may alternatively include a shift lever as its speed change operation tool.

The electromagnetic valve control device for each of the preferred embodiments described above is not necessarily mounted in a tractor, and may be mounted in any of various work vehicles such as an agricultural work vehicle.

Preferred embodiments of the present invention and modifications or combinations thereof are applicable to electromagnetic valve control devices to control electromagnetic valves for continuously variable transmissions and to work vehicles including electromagnetic valve control devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electromagnetic valve control device for a transmission to vary motive power from a driver with use of a gear transmission and a hydrostatic continuously variable transmission and output varied motive power, the electromagnetic valve control device being configured or programmed to control, based on a target gear ratio and with use of a value of an electric current for the continuously variable transmission, a first electromagnetic valve to control a pump swash plate on a normal rotation side of a neutral position and a second electromagnetic valve to control the pump swash plate on a reverse rotation side of the neutral position, the electromagnetic valve control device comprising:
   a current gear ratio obtainer to obtain a current gear ratio as a ratio of a number of output revolutions of the driver and a number of output revolutions of the transmission;
   a current electric current value obtainer to obtain a current electric current value as a value of an electric current to be inputted to the first electromagnetic valve or the second electromagnetic valve; and
   a switching controller configured or programmed to, based on the current electric current value and a gear ratio difference as a difference between the target gear ratio and the current gear ratio, perform electromagnetic valve switching control to switch between use of the first electromagnetic valve to control the pump swash plate and use of the second electromagnetic valve to control the pump swash plate.

2. The electromagnetic valve control device according to claim 1, wherein the switching controller is configured or programmed to perform the electromagnetic valve switching control in response to (i) the current electric current value being not larger than a predetermined electric current threshold value and simultaneously (ii) the gear ratio difference being not smaller than a predetermined gear ratio difference threshold value.

3. The electromagnetic valve control device according to claim 1, further comprising:
   a storage to store information on a rising electric current value as a value of the electric current at which value the pump swash plate starts to tilt from the neutral position; wherein
   the switching controller is configured or programmed to subtract the rising electric current value from the current electric current value to provide a first difference and perform the electromagnetic valve switching control in response to (i) the first difference being not larger than a predetermined first electric current threshold value as the electric current threshold value and simultaneously (ii) the gear ratio difference being not smaller than a predetermined first switching target deviation as the gear ratio difference threshold value.

4. The electromagnetic valve control device according to claim 3, wherein the switching controller is configured or programmed to perform the electromagnetic valve switching control in response to (i) the current electric current value being not larger than the rising electric current value and simultaneously (ii) the gear ratio difference being not smaller than a predetermined second switching target deviation as the gear ratio difference threshold value, the second switching target deviation being smaller than the first switching target deviation.

5. The electromagnetic valve control device according to claim 4, wherein the switching controller is configured or programmed to subtract the current electric current value from the rising electric current value to give a second difference and perform the electromagnetic valve switching control in response to (i) the second difference being not larger than a predetermined second electric current threshold value and simultaneously (ii) the gear ratio difference being not smaller than a predetermined third switching target deviation as the gear ratio difference threshold value, the third switching target deviation being smaller than the second switching target deviation.

6. The electromagnetic valve control device according to claim 5, wherein the switching controller is configured or programmed to retain the value of electric current to control the first electromagnetic valve and the second electromagnetic valve in response to (i) the second difference being not larger than the second electric current threshold value and simultaneously (ii) the gear ratio difference being smaller than the third switching target deviation.

7. The electromagnetic valve control device according to claim 1, wherein the switching controller is configured or programmed to avoid performing the electromagnetic valve switching control over a predetermined time period after once performing the electromagnetic valve switching control.

8. A work vehicle, comprising:
a driver;
a hydrostatic continuously variable transmission to vary motive power from the driver and output a varied motive power;
a gear transmission to composite motive power from the driver and motive power from the hydrostatic continuously variable transmission, vary the composite motive power, and output the varied composite motive power;
a first electromagnetic valve to control a pump swash plate of the continuously variable transmission on a normal rotation side of a neutral position;
a second electromagnetic valve to control the pump swash plate on a reverse rotation side of the neutral position; and
the electromagnetic valve control device according to claim 1.

* * * * *